(12) United States Patent
Fajardo et al.

(10) Patent No.: US 6,795,635 B1
(45) Date of Patent: Sep. 21, 2004

(54) WAVEGUIDES HAVING AXIALLY VARYING STRUCTURE

(75) Inventors: James Conrad Fajardo, Horseheads, NY (US); Gary Paul Granger, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/786,704

(22) PCT Filed: Aug. 10, 1999

(86) PCT No.: PCT/US99/18089
§ 371 (c)(1),
(2), (4) Date: Mar. 7, 2001

(87) PCT Pub. No.: WO00/16141
PCT Pub. Date: Mar. 23, 2000

Related U.S. Application Data
(60) Provisional application No. 60/100,349, filed on Sep. 15, 1998.

(51) Int. Cl.[7] .............................................. G02B 6/00
(52) U.S. Cl. ...................................... 385/140; 385/100
(58) Field of Search ................................ 385/100, 133, 385/134, 140

(56) References Cited

U.S. PATENT DOCUMENTS

| | | | |
|---|---|---|---|
| 3,920,312 A | 11/1975 | Siegmund | 350/96 |
| 4,288,144 A | * 9/1981 | Nakai et al. | 385/100 |
| 5,098,178 A | 3/1992 | Ortabasi | 505/1 |
| 5,309,540 A | 5/1994 | Turpin et al. | 385/123 |
| 5,398,296 A | * 3/1995 | Lin et al. | 385/96 |
| 5,627,921 A | 5/1997 | Lidgard et al. | 385/12 |
| 5,689,578 A | 11/1997 | Yamauchi et al. | 385/123 |
| 5,802,236 A | 9/1998 | DiGiovanni et al. | 385/127 |
| 6,282,342 B1 | * 8/2001 | Berkey et al. | 385/43 |
| 6,334,019 B1 | * 12/2001 | Birks et al. | 385/125 |
| 6,404,966 B1 | * 6/2002 | Kawanishi et al. | 385/125 |

FOREIGN PATENT DOCUMENTS

WO   WO 03/080524   10/2003   ......... C03B/37/027

OTHER PUBLICATIONS

Birks et al. "Single–mode photonic crystal fiber with an indefinitely large core", May 1998, Lasers and electro–optics, pp 226–227.*
Birks et al. "Endlessly single–mode photonic crystal fiber", Jul. 1997, Optics Letters, pp 961–963.*

* cited by examiner

*Primary Examiner*—Ellen Kim
(74) *Attorney, Agent, or Firm*—William J. Chervenak; Svetlana Z. Short

(57) ABSTRACT

Disclosed is an optical waveguide fiber preform and an optical waveguide fiber drawn therefrom, in which the density and thus the effective refractive index of the clad layer is caused to change in a pre-selected way axially along the waveguide preform and the associated waveguide fiber. The axial change in density of the clad layer is due to the fraction of the clad volume that is air or a glass of a composition different from that of the base clad glass. The axially variation in clad index changes the signal mode power distribution, thereby changing key waveguide fiber parameters such as magnitude and sign of dispersion, cut off wavelength and zero dispersion wavelength. The invention includes methods of making the structures having an axially varying clad layer. The invention relates to preforms and associated waveguide fibers which guide light due to difference in refractive index between core and clad. The invention also contemplates preforms, in which the waveguide fibers drawn therefrom, guide light due to the photonic crystal structure of all of the clad layer length or segments of the clad layer length.

39 Claims, 4 Drawing Sheets

FIG. 6B air holes

WAVEGUIDES HAVING AXIALLY VARYING STRUCTURE

This application is based upon the provisional application Ser. No. 60/100,349, filed Sep. 15, 1998, which we claim as the priority date of this application.

BACKGROUND OF THE INVENTION

The invention is directed to an optical waveguide preform or fiber having a structure that varies in the axial direction. In particular, the novel preform or waveguide exhibits a clad layer refractive index that varies along the waveguide length, the variation due to change in the clad layer porosity or composition. The invention includes methods for making the novel waveguide preform and fiber.

Optical waveguide fibers having a periodically structured clad layer have been discussed. As an example, the periodic structure of the clad layer may be a photonic crystal as described by Knight et al., "All Silica Single Mode Optical Fiber with Photonic Crystal Cladding", Optics Letters, V. 21, No. 19, 1 Oct. 1996, and by Birks, et al., "Endlessly Single Mode Photonic Crystal Fiber", Optics Letters. V. 22, No. 13, 1 Jul. 1997. In these two articles, a single mode fiber having a silica core and a porous silica cladding is described. The pores or voids in the silica clad layer are elongated and extend from end to end of the clad layer. The pores are arranged in a periodic hexagonal pattern to form the clad layer into a photonic crystal. The waveguide fiber so configured can be a single mode fiber at any wavelength.

Further work with waveguide fibers having a porous or pore filled clad layer is described in European patent publication EP 0 810 453 A1. In this publication, the clad layer contains elongated pores which serve to lower the average clad layer refractive index. The elongated pores are not arranged in a periodic pattern so the light guiding mechanism in this waveguide is refraction at the core-clad boundary.

The essentially limitless range of cut off wavelength, or, alternatively, the potential absence of any cut off wavelength, available in a photonic crystal clad layer is an advantage in single mode waveguide design. Also useful, in terms of offering an additional design variable, is the relative refractive index difference, $\Delta$, due to a clad layer containing a particular volume of non-periodic pores. This volume is controlled by controlling the air filling fraction in the fiber as is described below.

However, neither of these designs provide for axial changes in relative refractive index. Such axial changes are advantageous in single mode fiber designs intended to provide for management of dispersion. In addition, because the axial changes in relative index are due to changes in the clad layer, a new set of parameters, such as, pore volume, pore cross section, and pore pattern, are available to alter mode power distribution in the waveguide and thus alter key waveguide fiber properties. Combinations of axial changes in clad structure with the numerous core index profile designs are contemplated which will provide unique waveguide fiber properties. Clad layers which incorporate both photonic crystal light guiding and refractive light guiding are contemplated as advantageous in waveguide designs for dispersion management. In addition the present invention incorporates clad layer structures which contain an array of features, periodic or randomly distributed, comprising a material in place of the pores, which adds still further flexibility in waveguide fiber design.

SUMMARY OF THE INVENTION

The present novel waveguide preform and fiber and method of making the waveguide preform and fiber provide extra waveguide design variables and are advantageous in the making of dispersion compensating or dispersion controlled waveguides.

A first aspect of the invention is an optical waveguide fiber preform comprising a core glass region and a clad glass layer disposed upon the core glass. For convenience of description, the clad glass layer is said to be divided into segments that lie along the preform axis. The density of the clad glass changes in a direction, which is called the preform axis, parallel to the core region such that the clad glass density changes from segment to segment from a higher to a lower or from a lower to higher value. That is, the respective adjacent segment densities are not a monotone function of axial position.

The preform clad layer density can be made to alternate from high to low and low to high in adjacent segments by changing the porosity of the clad layer. In particular, respective adjacent segments along the preform axis could alternate between a condition in which the clad layer contains pores and a condition in which the clad layer is essentially free of pores. In an embodiment of the novel preform, the pores are elongated and arranged in a periodic array which can have pitch, i.e., a spacing between corresponding points in the pores. The pitch may be selected to lie in a number of different ranges. For use at optical telecommunication wavelengths the preform pitch is advantageously selected such that in the fiber drawn from the preform the pitch is in the range of about 0.4 $\mu$m to 20 $\mu$m. A typical outside diameter of the glass fiber is about 125 $\mu$m. The low end of this range provides a pitch in the drawn fiber effective to form a photonic crystal in the range of telecommunications signal wavelengths. However, applicants have verified that spacing or pitch in the range of tens of microns can advantageously be used in the making of a waveguide having an axially varying clad. Although an upper limit of 20 $\mu$m is set forth here, applicants contemplate the usefulness of still larger clad layer feature pitch. The upper limit of feature spacing or pitch is in fact a practical limit determined from the clad layer thickness.

Applicant has found that the diameter of the elongated pores as well as their pitch is important in determining the properties of the waveguide fiber drawn from the preform. In a particular embodiment, the ratio of the pore diameter to the pitch of the array of elongated pores is in the range of about 0.1 to 0.9.

The core glass of the preform may have a wide range of refractive index profiles. A refractive index profile of a region is the value of refractive index, or relative refractive index, $\Delta$, as a function of radial position across the region. The definitions of refractive index profile, segmented profile, $\Delta$, and $\alpha$-profile are known in the art and may be found in U.S. Pat. No. 5,553,185, Antos et al. or U.S. Pat. No. 5,748,824, Smith, which are incorporated herein by reference. Thus the core region of the preform may have a step shape, a trapezoidal shape, either of which may be rounded at sharp changes in slope, or an $\alpha$-profile shape. Further, the core region may be segmented into two or more portions and each of the portions may take on the alternative profiles set forth above. The design of this core region in conjunction with clad layer modulation determines the dispersion properties and other performance characteristics of the waveguide fiber.

The refractive index of a base glass material, such as silica, can be changed by incorporating dopants such as germania, alumina, phosphorus, titania, boron, fluorine and the like. Rare earth dopants such as erbium, ytterbium, neodymium, thulium, or praseodymium may also be added to provide a preform, which can be drawn into an optical amplifier waveguide fiber.

In another embodiment of the novel preform, the clad density toggles between two values from segment to segment along the preform axis. This toggling, together with the pre-selected core structure, determines the dispersion management characteristics of the fiber, as set forth above. Here again, the density may be controlled by controlling porosity volume in the clad layer segments. As an alternative, the density may be controlled by controlling the volume of a dopant glass added to the base clad layer glass. The dopant glass can appear as elongated filaments in the base glass of the clad. These filaments may be arranged in a periodic array in analogy to the arrangement of the elongated pores discussed above. One may speak of the filaments as being filled elongated pores, although it is to be understood that the filaments may be formed using several processes known in the art. If one wishes the filament containing clad layer to interact with light in the manner of a photonic crystal having a full band gap, the filament size and spacing should be such as to accommodate a pitch in the range of about 0.4 $\mu$m to 5 $\mu$m, and, the respective dielectric constants of the matrix glass and the glass comprising the columns of glass contained therein should differ by about a factor of three.

Either a porous clad layer or a filament filled clad layer may guide light by refraction at the core clad interface, the refractive index of the core being higher than what may be thought of as an average refractive index of the structured clad layer.

The preforms described above are fabricated for the purpose of drawing optical waveguide fibers therefrom. Thus the invention includes the optical waveguides which are drawn from the novel preforms.

A further aspect of the invention is a method of making the novel preform from which a novel waveguide is drawn. In a first method, a core preform is fabricated by any of several methods know in the art, including outside and axial vapor deposition, and MCVD or plasma deposition techniques. The core portion of the preform is non-porous solid. As an alternative the core preform may be a tube which has open ends and which is not altered in any way prior to forming the preform. This tube will collapse during the drawing step to form a homogeneous or doped (if the tube is doped) solid glass core region. A plurality of glass tubes having an opening extending through the tube are fabricated. The tubes are reduced in dimension at a pre-selected number of locations along the tubes and arranged about the centrally located core preform. Each of the reduced dimension tubes is essentially identical to every other of the reduced dimension tubes. The tubes may be partially or totally collapsed at the reduced dimension locations. The arrangement of the reduced dimension tubes about the centrally located core preform is a preform having axially variation in the clad layer density.

The tubes can have a circular shape or can be in the shape of a polygon of 3 or more sides. The array of tubes about the central core preform can be random or periodic, with the particular selected geometry depending upon the type of signal and waveguide interaction, either refractive or photonic crystalline, that is desired at the core-clad interface. In the case of a clad layer having photonic crystal properties and a full band gap, the pitch of the periodic array of tubes must be nearly of the order of the signal wavelength of light carried in the waveguide.

Instead of pores intermittently distributed along the tube length, the tubes may be fabricated using an outer matrix glass and a column of glass included therein. The individual segments of the tubes could be filled with a glass forming powder or a section of glass filament during the making of the reduced dimension portions or a filament could be placed in the tube before the dimension reduction is carried out. Either of these techniques, filament or powder fill, can be used in a process which provides filled tubes in which the fill material has a softening temperature significantly lower than the tube, for example more than 20° C. The alternative case, where the columns have a higher softening point than the tubes, is enabled by encasing the assembly of columns and tubes in a larger tube having a softening temperature near that of the columns. If the waveguide fiber drawn from the preform so constructed is to act as a photonic crystal, the difference in dielectric constant between the matrix glass and column glass should be no less than about a factor of three.

In order to draw the preform made in accord with the method, some means must be provided to hold the parts of the preform together. In one embodiment of the novel preform, the tubes and core preform are placed in a larger tube and the larger tube is collapsed onto the tubes and core preform assembly.

In another embodiment of the preform, the tubes and core preform may be inserted into chucks and a layer or soot deposited on the tubes and vitrified. The insertion into chucks can be facilitated by bundling the tubes and core preform prior to the chucking or deposition step. The bundling can be accomplished by heat tacking the parts of the preform to each other. As an alternative a frit can be used to glass solder the parts of the preform to each other. Another bundling alternative is to use straps to hold the preform parts together until chucking is completed. The straps may be removed before the start of deposition or be made of a material which will readily burn off during deposition of a first glass soot layer.

A further aspect of the invention is a method of making a waveguide fiber from the novel preform whose general configuration and particular embodiments are described above. An embodiment of the method of drawing a waveguide from the novel preform, includes the steps of sealing one end of each of the altered tubes surrounding the core preform and drawing a waveguide fiber from the opposing end. The pores within the altered tubes will persist through the drawing step because they are sealed into the tubes. Undesired pores or voids between tubes can be collapsed during the drawing step by applying a vacuum to the end of the preform opposite the end from which a waveguide is drawn.

Another embodiment of the method omits the step of sealing one end of the tubes surrounding the preform before the drawing step. The step of altering the cross section of the tubes along their length may also be omitted. In this embodiment, a gas pressure is applied to the unsealed tubes during the drawing step. An increase in the internal gas pressure of the tubes causes the tube openings to remain unchanged or become larger. A decrease in internal tube pressure causes the tube openings to become smaller or to close completely during draw. Thus the density of the waveguide fiber clad layer can be made to change in the axial direction by changing the gas pressure. An advantage of this embodiment is that the clad density can be varied essentially continuously from a solid glass to a glass having a maximum porosity limited only by the number of open tubes in the clad layer and the minimum wall thickness of the tubes together with the desired geometry of the finished waveguide fiber. An inert pressurizing gas such as nitrogen or helium is preferred. Undesired interstitial pores or voids among the tubes are subject to the applied pressure as well. Depending upon pore size through the tube relative to interstitial pore size the process alternatives are:

all pores are collapsed or closed;

all pores are left open;

the interstitial pores are left open while the tube pores are closed; or, the tube pores are left open while the interstitial pores are closed. It is understood that the pressure control allows for essentially a continuum of values of the ratio of final interstitial pore size to final tube pore size.

In yet another embodiment of the method, the preform parts are a core preform as described above having a clad layer comprising an array of glass rods arranged about the core preform. The array of rods is shaped such that a periodic or random array of pores are present between or through the rods. By intermittently applying a vacuum to this preform during the drawing step, these pores between the rods can be intermittently changed from a value equal to or less than the original pore cross section down to a minimum cross section of zero, thereby producing a waveguide which has an axially varying density. This same intermittent change in cross section can be accomplished by applying a gas pressure to the pores as described above for the open tubes. Here again the possible density of the clad layer can be made to vary essentially continuously from that of solid glass material to a porous glass material having a porosity limited only by the dimensions of the preform components and the waveguide drawn therefrom. The preform configuration in this embodiment is chosen such that viscous forces act to close the pores at neutral pressure. Then, the pore size can be modulated by modulating positive pressure applied to the preform during draw. This is the inverse of the embodiment in which the preform configuration is chosen such that the pore size can be modulated by modulating negative pressure.

A particularly useful embodiment of the novel waveguide is one in which the total dispersion is controlled from segment to segment of the waveguide. The combination of a pre-selected core refractive index profile with a particular pattern of change in clad layer segment density causes the total dispersion to alternate between positive and negative values. In a waveguide fiber having positive total dispersion, shorter wavelengths of light travel faster than light of longer wavelengths. The result is that the algebraic sum of the products of segment length and segment total dispersion over an entire length of waveguide fiber, i.e., the net total dispersion, can be made equal to a pre-selected target value. For example, the net total dispersion of a waveguide fiber can be made equal to zero even though no segment of the waveguide has a total dispersion of zero.

These and other features of the novel preform and the optical waveguide drawn therefrom are further described using the following drawings.

DETAILED DESCRIPTION OF THE INVENTION

The novel waveguide preform or waveguide fiber makes use of the guiding properties of clad layers having an axially varying refractive index which is lower than that of the waveguide core. A waveguide fiber is contemplated in which the guiding is done by structuring the clad layer to act as a photonic crystal having a band gap, at least over certain parts of the waveguide length. In each type of clad, the desired clad properties are achieved by altering the clad material composition or distribution.

One embodiment alters the clad layer by including pores of particular size and shape. In an analogous embodiment, a material having a dielectric constant different from the base clad glass, is included in place of the pores. In either case, the mode power distribution of signal light in the waveguide is affected, thus affecting the waveguide properties. Because both the core and the clad may be changed in the novel waveguide preform or fiber, a great deal of flexibility is available to an optical waveguide fiber designer.

Figure 1A:
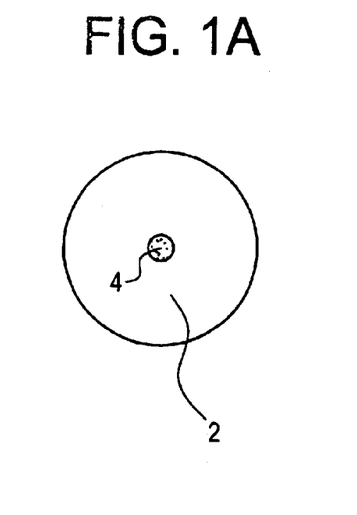
FIG. 1a is an illustration of a tube having a circular cross section.
Figure 1B:
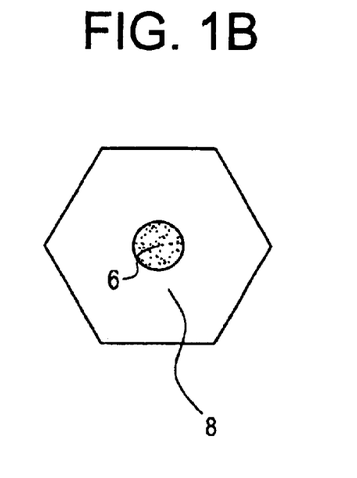
FIG. 1b is an illustration of a tube having a hexagonal cross section.

An interesting embodiment disclosed and described in this document is one in which elongated pores or glass filaments are included in the clad layer. Two possible substructures of such a clad layer are illustrated in FIGS. 1a and 1b, which are cross sections of tubes having respective centerline pores 4 and 6. The material surrounding the pore has a circular shape 2 in FIG. 1a and a hexagonal shape 8 in FIG. 1b. The outside shape is selected to accommodate a preferred pattern of pores to be formed by the substructures in the clad layer.

The pores 4 and 6 could be filled with a material comprising a glass having a dielectric constant different from that of the surrounding or matrix glass material.

Figure 2:
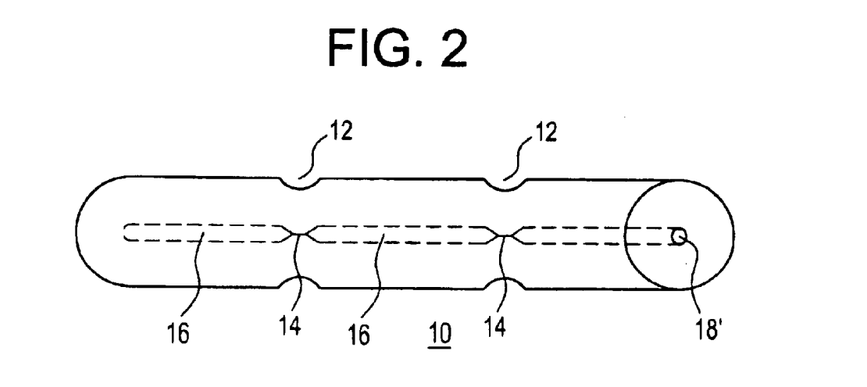
FIG. 2 is a sketch of a tube having segments of reduced dimension.

A step in the method of altering one of the substructures is illustrated in FIG. 2. Indentations 12 have been formed in the exemplary tube 10. The indentations produce restricted regions 14 in the central pore or filament separated by regions 16 over which the central portion of the tube is undisturbed. An assembly of such substructures about a core region provides a clad layer having axial variations in its refractive index. In addition, the substructures can be arranged such that the central pores or filaments 18 form a periodic array. The periodic array can have the pitch of a photonic crystal designed for use in a preferred wavelength range. At present, the wavelength range of interest for telecommunication applications is from about 600 nm to 2000 nm.

Figure 3:
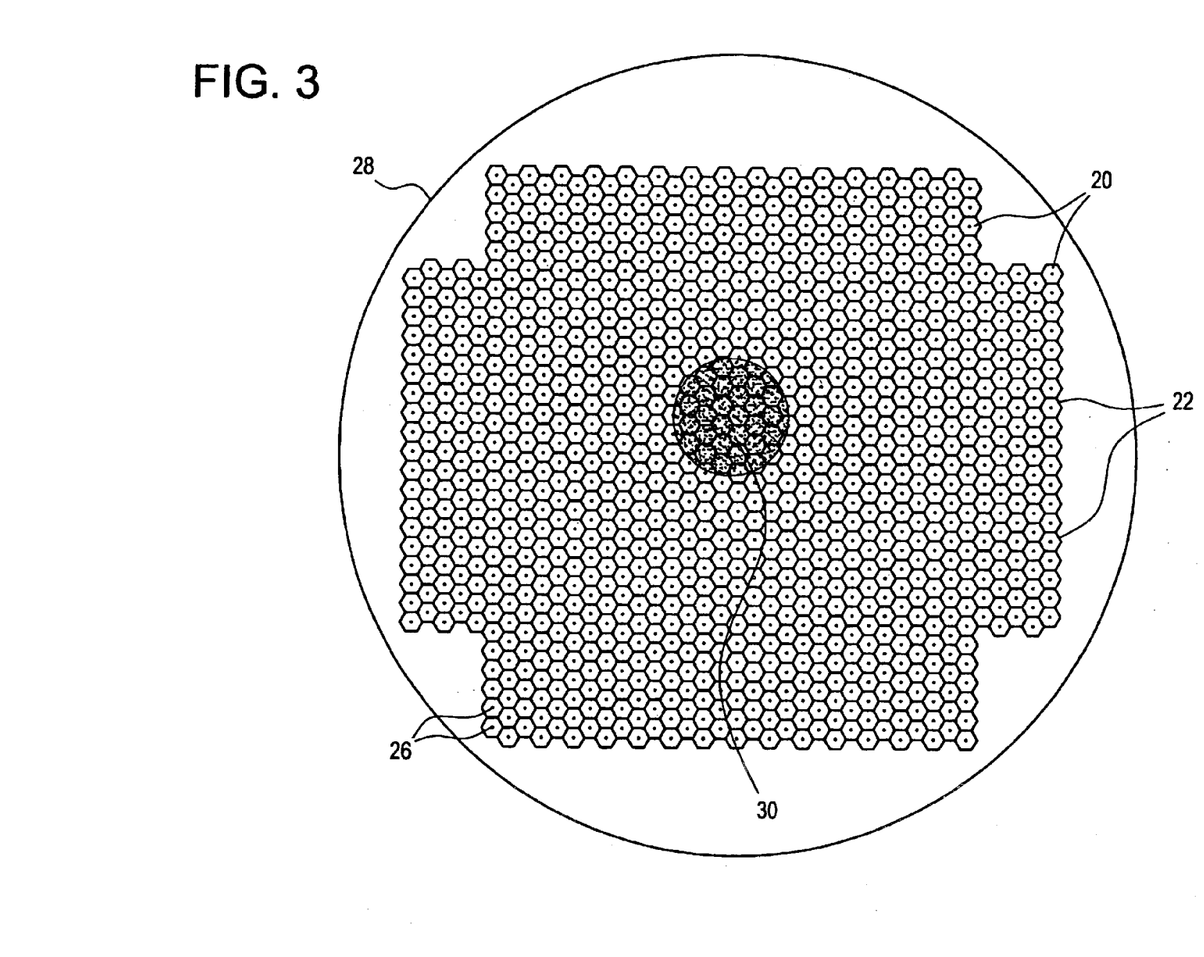
FIG. 3 is an illustration of hexagonal tubes arranged around a core preform and inserted into a larger holding tube.

A waveguide preform in accord with the present invention is shown in FIG. 3. In this example, the substructures are tubes 20 and 22 having essentially identical hexagonal cross sections. The difference in shading between tubes 20 and 22 indicates that the plurality of substructures may be formed into a secondary structure which is then assembled into a clad layer. As an alternative the shading can indicate that the substructures are of different composition and may be assembled to form a compositional pattern having components of area larger than that of the individual substructures. Such an assembly could be made for example in a process in which the secondary structures are extruded, assembled and then drawn to a desired cross sectional area. The extrusion and draw process is disclosed and described in Provisional Application Ser. No. 60/094,609 filed 30 Jul. 1998.

EXAMPLE

Referring to FIG. 3, a waveguide preform and fiber may be fabricated as follows. The hexagonal substructures 20 and 22, having an opening along the centerline, are assembled into a clad layer that surrounds core preform 30. The entire assembly of hexagonal tubes surrounding the core preform 30 is made stable by placing it into tube 28. The details of the illustration show the substructure openings as dots 26.

In this example, tubes 20 and 22 have a surface free of indentations. The ends of the tubes in the plane of FIG. 3 are shown as unsealed, by exemplary dots 26 which indicate an opening.

The tube 28 may be collapsed upon the assembly before or during drawing of the preform into a waveguide fiber. To insure proper control of the clad porosity, a pressure that ranges from atmospheric pressure upwards is applied to tube 28 during the drawing step. Over a first range of pressures beginning at atmospheric pressure and ending at a predetermined pressure above atmosphere, the substructure openings will close due to the action of viscous forces which exist during the drawing step. Over a second range of pressures, beginning slightly above the highest pressure in the first range of pressures and continuing upward, openings will exist in the clad layer after drawing is completed. The size of the openings is controlled by the magnitude of the applied pressure. The pressure applied to the substructure openings is varied between a value in the first pressure range to a value in the second pressure range during the drawing step. Thus, the diameter of the openings varies from zero to pre-selected diameter corresponding to the pressure selected from the second range. The modulation of the applied pressure produces a corresponding axial modulation of the clad layer density or refractive index. That is, the density and the average refractive index of the clad layer vary along the axial dimension of the waveguide fiber.

Comparative Example 1

An optical waveguide preform is fabricated as described in the example above except that in this comparative example the ends of the substructure tubes are sealed. In addition, the tubes are indented as shown in FIG. 2. The respective indentations of the substructure tubes are held in registration each to the others in tube 28. The registration is maintained by bundling or other means as described above.

An optical waveguide fiber is drawn from the preform end opposite the sealed ends of the substructure tubes. During draw a vacuum can be applied to the preform tube 28 at the preform end having the sealed substructure tubes. Thus, the altered, i.e., indented tubes, which are sealed, form elongated pores, arranged in essentially the same pattern as that of the substructures in the preform. The indented portions of the tubes collapse to form a substantially homogeneous clad cross section. The elongated pores are separated axially one from another by these collapsed sections of clad having a substantially homogeneous cross section. The elongated pores are separated one from another in cross section by the walls of the substructures. The vacuum, together with the viscous forces exerted in the preform during draw, serve to close unwanted interstitial pores between the substructure tubes.

In an embodiment of the preform and waveguide of this comparative example, the core portion of the preform may be an assembly of tubes having the desired composition and unsealed ends. During draw, the viscous forces, together with the applied vacuum act to close the openings in the unsealed core tubes to produce a solid glass core.

Figure 4:
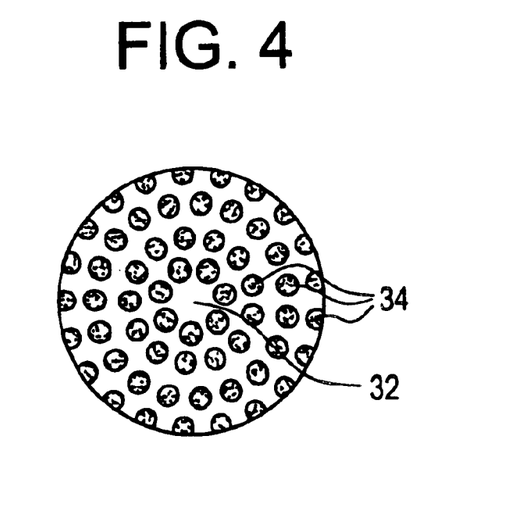
FIG. 4 is an illustration of a cross section of a preform or a waveguide having a core region and a porous or composite clad layer.

FIG. 4 is a drawing taken from a photograph of a cross section of a waveguide fiber drawn in accord with the example. The core region 32 is solid glass and the clad region cross section contains exemplary pores 34 which aserve to reduce the average refractive index of the clad layer.

It is understood that the pores 34 could be sized or configured to form a photonic crystal which confines the signal to the core region because the signal wavelength lies in the band gap of the crystal.

Comparison Example 2

Figure 5:
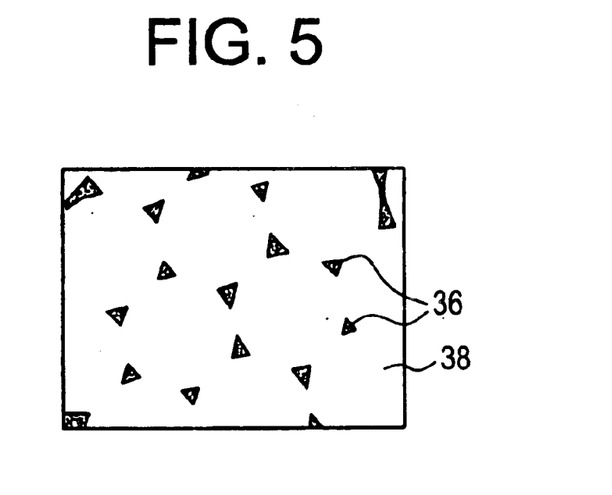
FIG. 5 is an illustration of a cross section of a waveguide having a core region and a porous clad layer in which the pores are due to interstitial pores among the clad layer tubes.

An alternative process is one in which the substructures are solid and are arranged within a large tube as in the comparative example 1 above. However in this case, the substructures are unaltered. During draw a vacuum is intermittently applied to tube 28 so that the interstitial pores, i.e., those between the substructures, are alternately collapsed (the vacuum is applied) or remain as elongated pores (the vacuum is turned off) in the clad layer. The result of such a process is shown in FIG. 5. which is a drawing taken from a photograph of the waveguide fiber clad layer cross section. The elongated pores 36 which are present in the clad layer are interspersed among the solid clad glass matrix 38. In the axial direction, the porous portions of the clad are separated one form another by the non-porous portions of substantially homogenous, pore free clad glass.

The effect of the introduction of pores into the clad layer is shown by the pairs of figures which make up FIG. 6. In FIG. 6a is shown a cross section of a non-porous portion of the waveguide fiber. Core or core preform 40 is surrounded by solid clad glass layer 42. In FIG. 6b, core or core preform 44 is surrounded by porous clad layer 46. The cores of FIGS. 6a and 6b, 6c and 6d, 6e and 6f, and, 6g and 6h correspond one to other in that the pairs may be drawn from the same preform. The first member of the pairs, i.e., FIG. 6a, c, e, and g have a solid clad layer while each of the second members of the pairs, FIGS. 6b, d, f, and h have a porous clad layer.

Figure 6A:
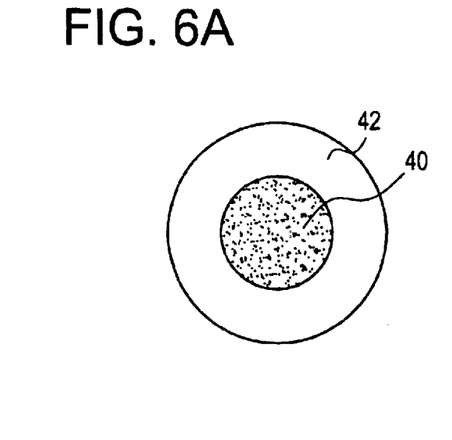
FIGS. 6a & b show cross sections of preforms or waveguides having respective solid and porous or composite clad layers.
Figure 6B:
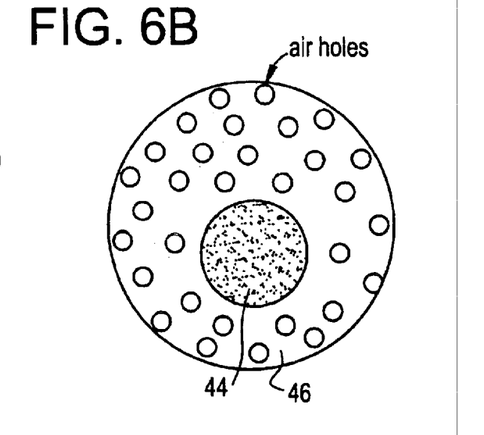
Figure 6C:
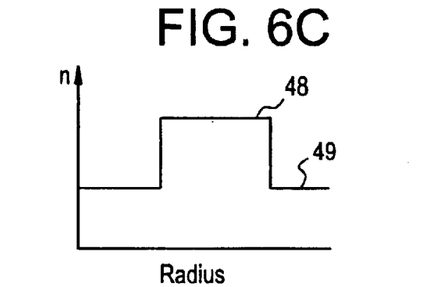
FIGS. 6c, e, & g show the core index profiles of preforms or waveguides having a solid clad layer.
Figure 6D:
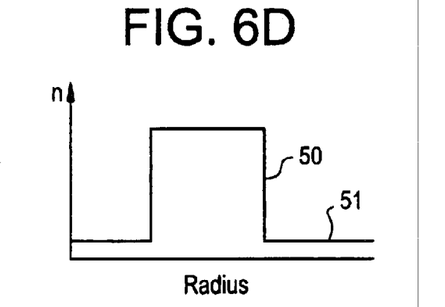
FIGS. 6d, f, & h show the core index profiles of preforms or waveguides having a porous or composite clad layer.
Figure 6E:
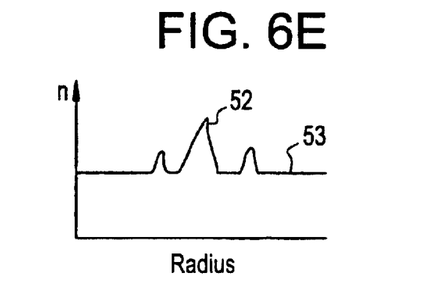
Figure 6F:
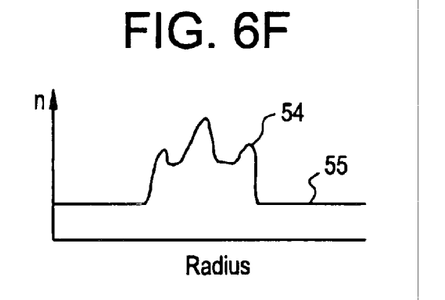

The effect of the elongated pores in the porous clad layer is illustrated in the pairs of figures showing refractive index profile. For example a step index core 48 in FIG. 6c has an index difference with reference to clad layer index 49. FIG. 6c corresponds to the solid core and clad structure shown in FIG. 6a. In comparison, the index difference between core index 50 and porous clad layer average index 51 as shown in FIG. 6d is greater. The mode power distribution of a signal in a portion of the waveguide characterized by the refractive index profile of FIG. 6c will be broad in comparison to the mode power distribution of a signal propagated in the waveguide region having the refractive index profile of FIG. 6d. It will also be understood, that other properties, such as total dispersion, total dispersion slope, cut off wavelength, zero dispersion wavelength are also different for different axial portions along the novel waveguide. One properly constructed and drawn preform produces a waveguide fiber having these axial variations in waveguide fiber properties.

In analogy with FIGS. 6c and 6d, FIGS. 6e and 6f show the relative profiles for the case in which the core has three segments. The core 52 has a given index profile relative to clad layer 53. By introducing pores into the clad layer, the larger refractive index difference, that between core index 54 and clad layer index 56, is achieved. Here again, the relative index difference alters the mode power distribution of a signal propagated in the waveguide.

Figure 6G:
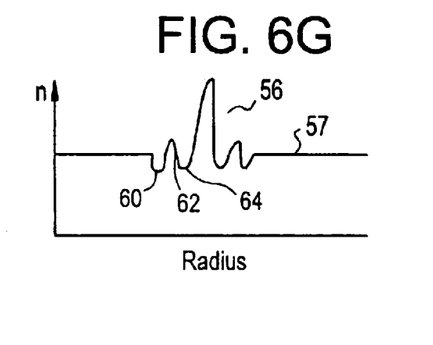
Figure 6H:
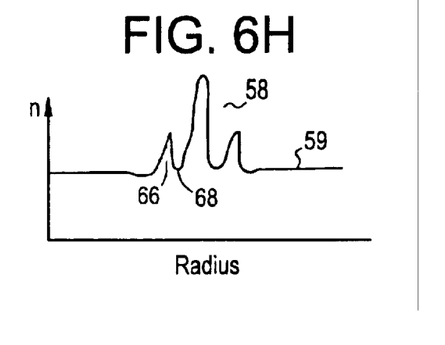

In FIGS. 6g and 6h the axial change in clad index results in a first profile 56, relative to clad layer index 57, having three distinct annular regions, 60, 62, and 64. In contrast, the core profile 58, relative to the index of porous or pore filled clad layer 59 has only two distinct annular regions 66 and 68.

The potential of the novel waveguide preform and associated waveguide fiber to compensate dispersion is readily seen in FIGS. 6(c–h). Further, control of mode power distribution provides control of such key waveguide fiber parameters as cut off wavelength, zero dispersion wavelength, and the magnitude and sign of waveguide dispersion, thereby providing great flexibility in the uses of the novel waveguide.

Although particular embodiments of the invention have herein been disclosed and described, the invention in nonetheless limited only by the following claims.

We claim:

1. An optical waveguide preform comprising:
a central core glass surrounded by and in contact with a clad glass layer to from a preform, the preform having a first and a second end and an axis there between, and the clad layer comprising a plurality of annular segments, that extend sequentially along the axis and with densities that differ along the axis from one another, wherein the segments are characterized by a pre-selected density different form the pre-selected density of the segments immediately adjacent the each segment, and, the each segment density is either higher or lower than both immediately adjacent segments.

2. The optical waveguide preform of claim 1 in which the segments, that have a pre-selected density lower than that of adjacent segments, contain pores.

3. The optical waveguide preform of claim 2 in which the segments that have a pre-selected density higher than that of adjacent segments also contain pores.

4. The optical waveguide preform of claim 2 in which the pores are elongated and have their long dimension oriented along the axis of the preform.

5. The optical waveguide preform of claim 4 in which the elongated pores form a periodic array.

6. The optical waveguide preform of claim 1 in which the core glass has a refractive index profile which is selected from a group consisting of a step, a rounded step, a trapezoid, an α-profile, and a segmented profile wherein the segments of the segmented profile are selected from a group consisting of a porous layer, a step, a rounded step, a trapezoid, a rounded trapezoid, and an α-profile.

7. The optical waveguide preform of claim 6 in which the core glass comprises silica glass having a dopant selected from the group consisting of germania, alumina, phosphorus, titania, boron, and fluorine.

8. The optical waveguide preform of claim 7 in which the core glass comprises silica doped with a substance selected from the group consisting of erbium, ytterbium, neodymium, thulium, and praseodymium.

9. The optical waveguide preform of claim 1, wherein, the density of a clad layer segment has one of two pre-selected values.

10. The optical waveguide preform of claim 9, wherein, the clad glass layer segment having the first one of the two pre-selected densities is a homogeneous first composition, and the clad glass layer segment having the second one of the two pre-selected densities comprise a porous first composition.

11. The optical waveguide preform of claim 10, wherein, the pores of the clad layer having the second pre-selected density are elongated and have their long dimension oriented along the axis of the preform.

12. The optical waveguide preform of claim 11 in which the elongated pores form a periodic array.

13. The optical waveguide preform of claim 12 in which the pitch of the periodic array is such that a waveguide fiber drawn from the preform to a pre-selected diameter contains a periodic array of elongated pores having a pitch in the range of 0.4 μm to 20 μm.

14. The optical waveguide of claim 9, wherein, the clad glass layer segment having the first one of the two pre-selected densities is a homogeneous first composition having a dielectric constant, and the clad glass layer segment having the second one of the two pre-selected densities comprises a porous first composition, wherein, the pores are elongated and the long dimension of the pores are oriented along the preform axis, and wherein, the elongated pores are filled with a material having a second dielectric constant, wherein the first and second dielectric constants differ by a factor of at least three.

15. The optical waveguide 14 in which the elongated filled pores form a periodic array.

16. The optical waveguide preform of claim 15 in which the pitch of the periodic array is such that a waveguide fiber drawn from the preform to a pre-selected diameter contains a periodic array of elongated pores having a pitch in the range of 0.4 μm to 20 μm.

17. An optical waveguide preform comprising: a central core glass surrounded by and in contact with a clad glass layer to from a preform, the preform having a first and a second end and an axis there between, and the clad layer comprising a plurality of annular segments that extend sequentially along the axis and with densities that differ along the axis from one another wherein, the segments are characterized by a pre-selected density different form the pre-selected density of the segments immediately adjacent the each segment, and the each segment density is either higher or lower than both immediately adjacent segments, the segments that have a pre-selected density lower than that of adjacent segments contain pores and the segments that have a pre-selected density higher than that of adjacent segments also contain pores, wherein the pores are elongated and have their long dimension oriented along the axis of the preform.

18. The optical waveguide preform of claim 17 in which the elongated pores form a periodic array.

19. The optical waveguide preform of either of one of claim 5 or 18 in which the pitch of the periodic array is such that a waveguide fiber drawn from the preform to a pre-selected diameter contains a periodic array of elongated pores having a pitch in the range of 0.4 μm to 20 μm.

20. The optical waveguide preform of either of claim 5 or 18 in which the elongated pores have a diameter and the ratio of the diameter to the pitch of the periodic array is in the range of about 0.1 to 0.9.

21. An optical waveguide fiber drawn from the preform of any one of claims 1–18.

22. An optical waveguide fiber drawn from the preform of any one of claims 1–18 in which the core ahs a refractive index profile and the segment densities are selected to provide in conjunction with the core profile a total dispersion which alternates between positive and negative values as the segment density alternates between different pre-selected densities, to provide a waveguide fiber having a net dispersion equal to a pre-selected value.

23. A method of making an optical waveguide fiber preform comprising the steps:
   a) fabricating a core preform having a long axis;
   b) fabricating a plurality of glass tubes having an inside and an outside dimension and a long axis;
   c) forming along the long axis in each of the plurality of glass tubes a number, N, of sections of reduced inside and outside dimension, wherein, the N reduced dimension sections are spaced apart, each from another, by a section of the tube;
   d) arranging the plurality of tubes of step C) in an array surrounding the core preform; wherein the long axis of the core preform is substantially parallel to the long axes of the tubes.

24. The method of claim 23 in which the tubes of step b) have a cross section shape selected from the group consisting of a circle, a triangle, and parallelogram, and a polygon.

25. The method of claim 23 in which the array is random.

26. The method of claim 23 in which the array is periodic.

27. The method of claim 23 in which the reduced inside dimension is zero.

28. The method of claim 23, in which the tube has a first composition and a first dielectric constant, and during or before the forming step c) each of the sections which space apart the N sections are filled with a material having a second composition and a second dielectric constant, wherein the first dielectric constant differs from the second dielectric constant by a least a factor of three.

29. The method of claim 23, in which the tube has a first composition and a first refractive index, and during or before the forming step c) each of the sections which space apart the N sections are filled with a material having a second composition and a second refractive index, wherein the first refractive index is greater than the second refractive index.

30. The method of claim 23 further including the steps:
   e) inserting the arrangement of step d) into an outer tube; and
   f) collapsing the outer tube onto the arrangement.

31. The method of claim 30 further including the step of depositing glass soot particles onto the outer tube.

32. The method of claim 23 further including the steps:
   e) bundling the arrangement of tubes of step d) to hold them in registration each to another; and,
   f) depositing glass soot onto the bundle.

33. The method of claim 32 in which the step of bundling includes tacking the glass tubes each to another and the innermost tubes to the core preform by means of heating the tubes.

34. The method of claim 32 in which the step of bundling includes tacking the glass tubes each to another and the innermost tubes to the core preform using a glass frit.

35. A method of making an optical waveguide fiber comprising the steps:
   a) fabricating a preform in accord with any of one of claims 23–34;
   b) sealing one end of the glass tubes;
   c) drawing a waveguide fiber from the preform end opposite the preform end having sealed tubes; and,
   d) applying a vacuum to the preform end opposite the end being drawn.

36. A method of making an optical waveguide fiber comprising the steps:
   a) fabricating a core preform;
   b) fabricating a plurality of glass rods having a cross sectional shape;
   c) arranging the plurality of rods in an array surrounding the core preform such that the array contains a plurality of pores;
   d) inserting the array of rods and the core preform into a tube to form a draw preform;
   e) drawing an optical waveguide fiber from the draw preform; and,
   f) during step e) applying a varying pressure to the tube.

37. The method of claim 36 in which the applied pressure varies between atmospheric pressure and a pre-selected pressure below atmospheric pressure.

38. The method of claim 37 in which the pre-selected pressure is sufficient to at least partially collapse the pores.

39. The method of claim 37 in which the applied pressure varies between a first pre-selected pressure greater than or equal to atmospheric pressure and a second pre-selected pressure greater than the first pre-selected pressure.

* * * * *